United States Patent
Underbrink et al.

(10) Patent No.: US 9,213,078 B1
(45) Date of Patent: Dec. 15, 2015

(54) NOISE SOURCE DECOMPOSITION SYSTEM AND METHOD USING AN ADAPTABLE APERTURE PHASED ARRAY

(71) Applicant: The Boeing Company, Chicago, IL (US)

(72) Inventors: James Robert Underbrink, Seattle, WA (US); Leon Brusniak, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/292,854

(22) Filed: May 31, 2014

(51) Int. Cl.
G06K 19/06 (2006.01)
G01S 3/80 (2006.01)

(52) U.S. Cl.
CPC ........................................ *G01S 3/80* (2013.01)

(58) Field of Classification Search
CPC .. G06K 19/06037; G06K 7/14; G06K 7/1417
USPC .......... 235/494, 487; 367/909, 118, 125, 126, 367/99, 119
See application file for complete search history.

(56) References Cited

U.S. PATENT DOCUMENTS

| | | | |
|---|---|---|---|
| 3,985,024 A | 10/1976 | Horak | |
| 6,205,224 B1 | 3/2001 | Underbrink | |
| 6,583,768 B1 | 6/2003 | Underbrink | |
| 7,139,221 B1 * | 11/2006 | Carter et al. | 367/125 |
| 7,330,396 B2 | 2/2008 | Wu | |
| 7,671,761 B2 | 3/2010 | Lapp | |
| 7,929,376 B2 | 4/2011 | Underbrink et al. | |
| 8,009,507 B2 | 8/2011 | Underbrink | |
| 2006/0256975 A1 | 11/2006 | Brooks et al. | |
| 2009/0268555 A1 | 10/2009 | Underbrink et al. | |
| 2009/0326870 A1 | 12/2009 | Brusniak | |
| 2010/0175474 A1 * | 7/2010 | Underbrink | 73/618 |

OTHER PUBLICATIONS

Robert P. Dougherty, Extensions of DAMAS and Benefits and Limitations of Deconvolution in Beamforming, 11th AIAA/CEAS Aeroacoustics Conference May 23-25, 2005, Monterey, California.
Thomas F. Brooks, William M. Humphreys, A Deconvolution Approach for the Mapping of Acoustic Sources (DAMAS) Determined From Phased Microphone Arrays, Journal of Sound and Vibration 294 (2006) 856-879.

(Continued)

*Primary Examiner* — Karl D Frech
(74) *Attorney, Agent, or Firm* — John S. Economou

(57) ABSTRACT

A system and method for determining a characteristic of a noise source. A first array of microphones is mounted on a platform moveable from a starting position to an ending position along a line parallel to a central axis of the noise source. A second array of microphones includes sound sensors mounted in a spaced apart fixed position with respect to the noise source. A processing system processes first information from the first array of microphones and second information from the second array of microphones. The processing system collects and stores the first and second information at each discrete step of the first array, spatially filters the first information, processes and calibrates the filtered first information based on the second information, and further processes the calibrated first information to obtain a characteristic at a selected location. For flyover testing, the first array is instead held in a fixed position.

20 Claims, 13 Drawing Sheets

(56) References Cited

OTHER PUBLICATIONS

Thomas F. Brooks, William M. Humphreys, Extension of DAMAS Phased Array Processing for Spatial Coherence Determination (DAMAS-C), 12th AIAA/CEAS Aeroacoustics Conference, May 8-10, 2006, Cambridge, MA.

Eric Nesbit, Leon Brusniak, James Underbrink, Denis Lynch, Michael Martinez, Effects of Chevrons on Jet Engine Noise Structure, 13th AIAA/CEAS Aeroacoustics Conference, May 21-23, 2007, Rome, Italy.

Eric Nesbit, Leon Brusniak, James Underbrink, Denis Lynch, Michael Martinez, Phased Array Measurements of Full-Scale Engine Exhaust Noise, 13th AIAA/CEAS Aeroacoustics Conference, May 21-23, 2007, Rome, Italy.

Pieter Sijtsma, Clean Based on Spatial Source Coherence, National Aerospace Laboratory NLR—Dec. 2007, The Netherlands.

Brian J. Tester, S.A.L.Glegg, A Review of Engine Noise Source Diagnostic Methods for Static Engine Tests, With Phased Array and Polar Correlation Techniques, 14th AIAA/CEAS Aeroacoustics Conference, May 3-7, 2008, Vancouver, British Columbia, Canada.

Elias J. G. Arcondoulis, Con J. Doolan, Anthony C. Zander, Laura A. Brooks, Design and Calibration of a Small Aeroacoustic Beamformer, Proceedings of 20th International Congress on Acoustics, ICA, Aug. 23-27, 2010, Sydney, Australia.

Yueping Guo, Leon Brusniak, Michael Czech, Russell H. Thomas, Hybrid Wing-Body Aircraft Slat Noise, AIAA Journal, vol. 51, No. 12, Dec. 2013—U.S.

Extended European Search Report for corresponding European Patent Application No. 15163683, dated Oct. 30, 2015.

* cited by examiner

NOISE SOURCE DECOMPOSITION SYSTEM AND METHOD USING AN ADAPTABLE APERTURE PHASED ARRAY

FIELD

This disclosure relates generally to a system and method for using adaptable aperture phased arrays for noise source decomposition.

BACKGROUND

The analysis of noise and the sources or causes of noise is often performed to understand the physics behind the noise generation. For example, an analysis may be performed to identify where the noise is coming from. This type of analysis may be performed in the testing of devices. For example, noise data may be collected for an aircraft engine, such as a jet engine. The noise data collected may be analyzed to determine what components within and exterior to the jet engine contribute to the noise. These different components may also be referred to as component noise sources. Different structures or physical elements in a jet engine or in the jet exhaust generated by a jet engine may contribute different noises at different frequencies, including, for example, different surfaces within ducts and inlets of a jet engine and the high speed exhaust flow.

Although conventional systems and methods for analyzing noise data provide some useful information, none are able to extract noise subcomponent spectra from collected phase array data acquired at multiple phase array positions and to project such data to any allowable spatial location of interest. In addition, none are able to provide subcomponent source location variation with frequency and directivity based on various source location definitions.

Accordingly, there is a need for a system and method which overcomes the drawbacks of the conventional systems and methods described above.

SUMMARY

In one aspect, a system for determining at least one characteristic of a device under test. A first array of sound sensors is mounted on a platform. A second array of sound sensors includes sound sensors mounted in a spaced apart fixed position. A processing system processes first information from the sound sensors in the first array of sound sensors and second information from the second array of sound sensors. The processing system is configured to collect and store the first and second information for a plurality of predetermined points, to spatially filter the first information, to process and then calibrate the filtered first information based on the second information, and to further process the calibrated first information to obtain a characteristic at a selected location.

In one further embodiment, the platform is moveable from a starting position with respect to the device under test to an ending position with respect to the device under test. Further, the spaced apart fixed position is with respect to the device under test. Finally, the processing system is further configured to collect and store the first and second information for a plurality of predetermined points as the first array of sound sensors is moved from the starting position to the ending position.

In another further embodiment, the platform is fixed and the processing system is configured to collect and store the first and second information as the device under test moves from a starting position to an ending position.

The processing system may be further configured to extract source location information from the processed and calibrated first information. The first array may be an adaptable aperture planar array. The second array may be a polar array with each sound sensor in the second array spaced an even distance from an origin point located proximal to the device under test. The processing of the first information may include determining usable frequency ranges and usable first array positions. The processing of the first information may include correcting for at least one of distance, atmospheric absorption, pressure doubling and shear layer refraction effects. The processing of the first information may include determining a space over which the filtered first information can be projected. The processing of the first information may include determining a noise source directivity characteristic for each point within the filtered first information.

In another aspect, a computer-implemented method for determining at least one characteristic of a device under test. First information is collected and stored from a first array of sound sensors, the first array is mounted on a platform. Second information is collected and stored from a second array of sound sensors, each of the sound sensors in the second array mounted in a spaced apart fixed position. The first information and the second information are collected and stored for a plurality of predetermined points. Next, the first information is spatially filtered. The filtered first information is processed and then calibrated based on the second information. Finally, the calibrated first information is processed to obtain a characteristic at a selected location.

In one further embodiment, the platform is moveable from a starting position with respect to the device under test to an ending position with respect to the device under test and the spaced apart fixed position is with respect to the device under test. In addition, the first and second information are collected and stored for a plurality of predetermined points as the first array of sound sensors is moved from the starting position to the ending position.

In another further embodiment, the platform is fixed and the first and second information are collected and stored as the device under test moves from a starting position to an ending position.

In yet another aspect, a non-transitory computer readable storage medium storing computer usable program code for determining at least one characteristic of a sound source. Program code is provided for collecting and storing first information from a first array of sound sensors, the first array mounted on a platform that is moveable from a starting position with respect to the noise source to an ending position with respect to the noise source, and second information from a second array of sound sensors, each of the sound sensors in the second array mounted in a spaced apart fixed position with respect to the noise source, the first information and the second information collected and stored for a plurality of predetermined points as the first array of sound sensors is moved from the starting position to the ending position. Program code is also provided for spatially filtering the first information. Program code is also provided for processing and then calibrating the filtered first information based on the second information. Finally, program code is provided for further processing the calibrated first information to obtain a characteristic at a selected location.

In one further embodiment, the platform is moveable from a starting position with respect to the device under test to an ending position with respect to the device under test. The spaced apart fixed position is with respect to the device under test. Finally, the program code for collecting and storing also collects and stores the first and second information for a plurality of predetermined points as the first array of sound sensors is moved from the starting position to the ending position.

In another further embodiment, the platform is fixed and the program code for collecting and storing also collects and stores the first and second information as the device under test moves from a starting position to an ending position.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1A:
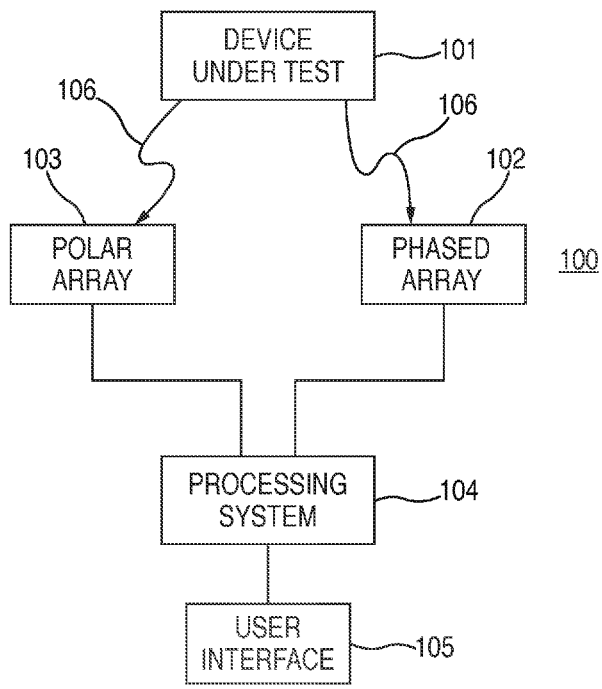
FIG. 1A is a block diagram showing a noise source testing system used in conjunction with the present disclosure.

Referring now to FIG. 1A, a noise collection and analysis system 100 is shown that is useful in phased array analysis for separating device under test subcomponent noise sources. In system 100, a device under test 101 emits noise (shown by ref. no. 106) that is detected by both a phased array 102 of sound sensors and a far-field (and, in an exemplary embodiment, polar) array 103 of sound sensors. Phased array 102 and far-field array 103 are described below with respect to FIG. 3. A processing system 104 receives the signals from the phased array 102 and the far-field array 103 and processes such signals in accordance with the methods disclosed herein, under the control of a user via user interface 105 (e.g., a keyboard, mouse and video display). As one of ordinary skill in the art will readily understand, processing system 104 may digitize the signals from each sound sensor or such signals may be locally digitized at arrays 102, 103 and provided as digital signals to processing system 104. The sound sensors in each array 102, 103 maybe be any suitable sensor for detecting sound, including but not limited to microphones, hydrophones, laser sensors, and seismometers.

Figure 1B:
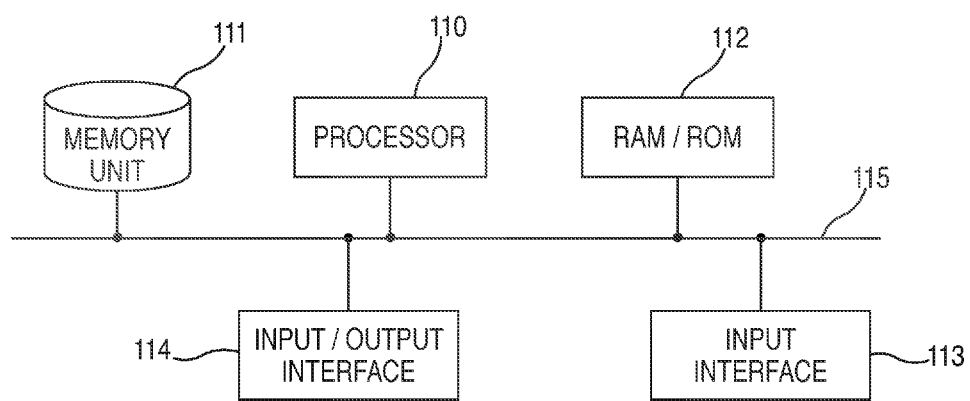
FIG. 1B is a block diagram of the processing system shown in FIG. 1A and used in conjunction with the present disclosure.

As shown in FIG. 1B, processing system 104 may be a conventional computing system for processing the noise signals detected by arrays 102, 103 and may include, for example, a processor 110, a memory unit 111, RAM/ROM 112, an input interface 113 and an input/output interface 114, all of which may be coupled via a bus 115. As one of ordinary skill in the art will readily recognize, many other computer architectures may be substituted for the architecture shown in FIG. 1B and provide comparable results. In particular, the processing system 104 may operate under an operating system stored in memory unit 111 and loaded at startup via a built-in operating system (BIOS) stored in RAM/ROM 112. The operating system may provide a user interface via input/output interface 114 (which may constitute, at least in part, a keyboard interface, a mouse interface and a video display interface). Preferably the user interface is a graphical user interface (GUI). The operating system allows computer programs stored on memory unit 111 to be executed under user control. Input interface 113 is coupled to the phased array 102 and far-field array 103 of sound sensors and may include suitable analog to digital converters to generate digital signals corresponding to the sound signals detected at each of the sound sensors in arrays 102, 103. In the alternative, as discussed above, the analog to digital conversion may be done locally at each array 102 and 103 and input interface may be alternatively configured to receive digital signals instead of analog signals. Processing system 104 preferably includes one or more computer programs stored on memory unit 111 which, under user control, performs the method of FIG. 3 discussed below.

Figure 2:
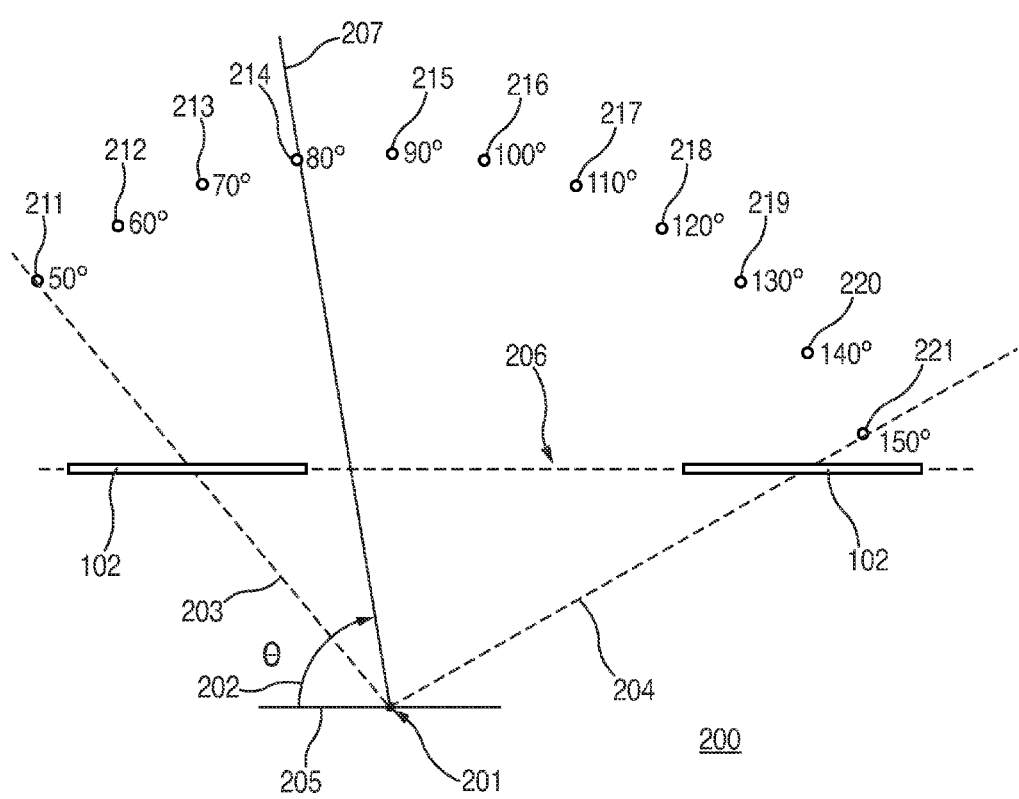
FIG. 2 is a diagram showing a configuration of a noise source testing system used in conjunction with the present disclosure.

Referring now to FIG. 2, an overhead view of a test system layout 200 is shown. In particular, a device under test is positioned with a key point at a reference point 201 positioned along an origin line 205. The key point of the device under test may be a primary nozzle exit of an aircraft engine, for example. The phased array 102 is movable (e.g., along line 206) and is shown in FIG. 2 at an initial position (at an angle of 50° designated by dotted line 203) and at a final position (at an angle of 150° designated by dotted line 204). During testing, as discussed below, noise data is collected at discrete points (e.g., 10° steps) as phased array 102 traverses along line 206. Phased array 102 consists of a plurality of sound sensors mounted on a vertical planar array and is an adaptable aperture planar array as described in commonly assigned U.S. Pat. No. 8,009,507 B2 ("the '507 patent"), the disclosure of which is incorporated herein by reference. The construction and operation of phased array 102 is fully set forth in the '507 patent and will not be repeated herein. The sound sensors mounted on phased array 102 have a nested pattern, and the generation of the pattern of each of the nested arrays is described in commonly assigned U.S. Pat. No. 6,583,768, the disclosure of which is also incorporated herein by reference. The far-field array 103 consists of a series of sound sensors 211 to 221 which, in an embodiment, may be each positioned at an equal distance from reference point 201 at angles from 50° to 150° (as shown in FIG. 2) with respect to reference point 201. When testing noise emitted by an aircraft engine positioned with the primary nozzle exit at reference point 201, each sound sensor may be positioned 25 feet from reference point 201. In an alternative embodiment, the sound sensors 211 to 221 in far-field array 103 may be positioned in other configurations, e.g., along a line that is parallel to line 206 or on another well-behaved spatial curve. In another alternative embodiment, sound sensors embedded in phased array 102 may be used for calibration. Although the test setup shown in FIG. 2 shows an angular range of 50° to 150° for phased array 102 and for far-field array 103, this range may be increased or decreased, depending on the device under test and the space available for testing, for example, and still provide acceptable results. In an exemplary embodiment, data is collected at discrete points as the phased array 102 is moved in 10° steps. Also, data may be acquired in various facilities, including open jet facilities for which a wind tunnel shear layer may exist between the phased array 102 and the device under test. Appropriate corrections for refraction and attenuation of sound owing to the shear layer would be applied in such a configuration using methods familiar to those who are skilled in the art. Furthermore, in some situations, the phased array 102 may be fixed in place and the device under test may be moved instead (e.g., along line 205) such as would occur in flyover testing.

In one embodiment, the phased array 102, as explained in more detail in the '507 patent, may consist of 416 sound sensors distributed over four subarrays of various sizes, with the subarrays providing overlapping coverage over the frequency ranges of interest. The four sizes may be referred to as: small (S), medium (M), large (L) and extra-large (XL), with the baseline sub-arrays containing, respectively, 170, 199, 110 and 170 sound sensors. The horizontal/vertical sub-array apertures may be approximately 12 inch×9 inch (S), 26.2 inch×19.8 inch (M), 57.6 inch×43.6 inch (L) and 126 inch×95.6 inch (XL) in size. A sharing of sound sensors between the various sub-arrays may be used to reduce the overall sound sensor count required to make measurements with the fidelity afforded by the array.

Figure 3:
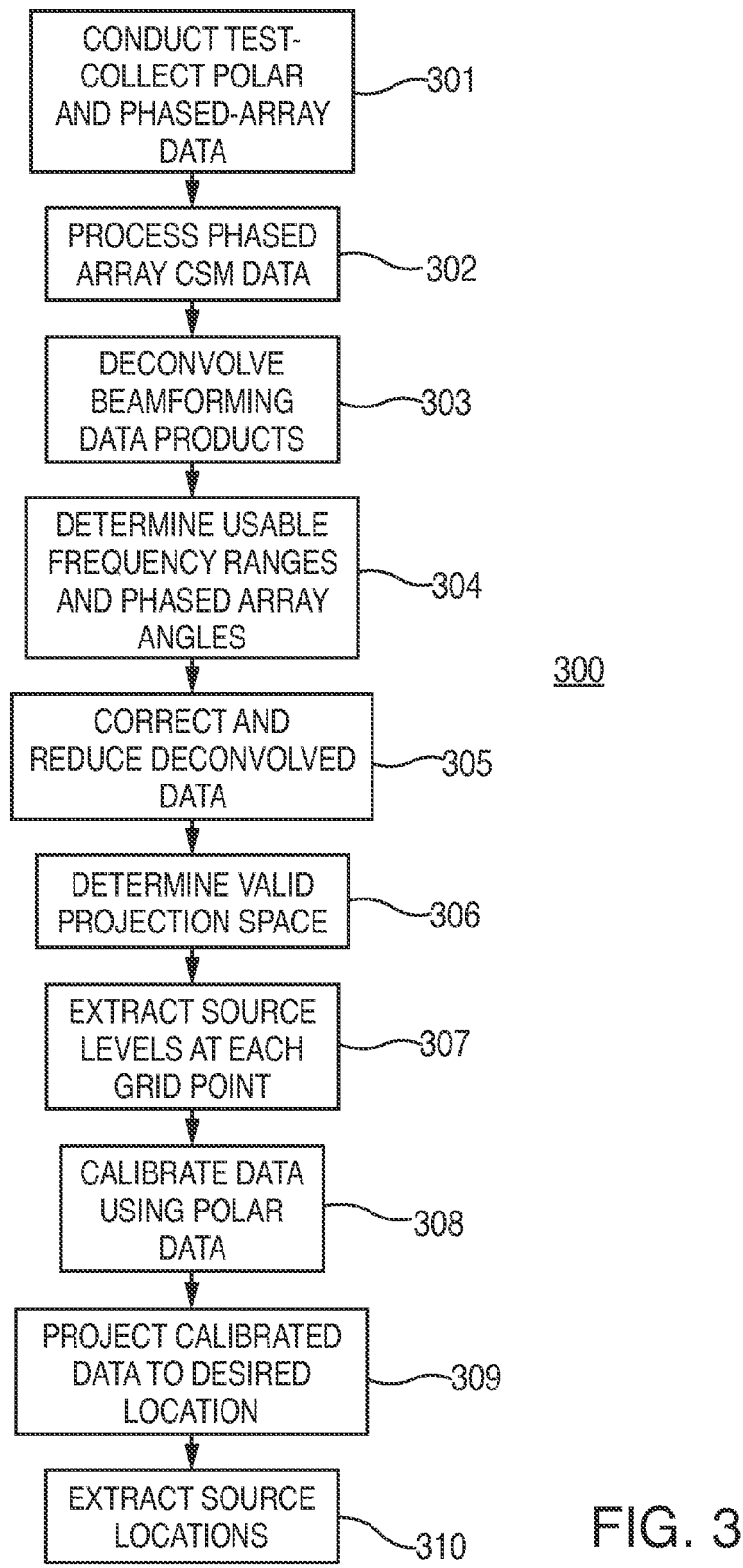
FIG. 3 is a flowchart of a presently preferred method according to present disclosure.

Referring now to FIG. 3, a flowchart 300 is shown for performing the method of the instant disclosure. First, at step 301, data is collected at every sound sensor during noise testing for each position of phased array 102, as discussed above. In particular, as discussed in more detail in the '507 patent, phased array 102 is moved, in one embodiment, in discrete steps, for example 10° steps, from a first position, e.g., 50° relative to reference point 201, to a second position, e.g., 150° relative to reference point 201 (the angle is typically measured to the center of phased array 102 as shown in FIG. 2). The data is stored in memory, and the data from the sound sensors in phased array 102 is first stored as a time series and then processed into a cross-spectral matrix (CSM) and stored. In another embodiment, phased array 102 and sound sensors 211 to 221 are held stationary while the device under test moves along a curved path relative to phased array 102 (e.g., in flyover testing).

Figure 4A:
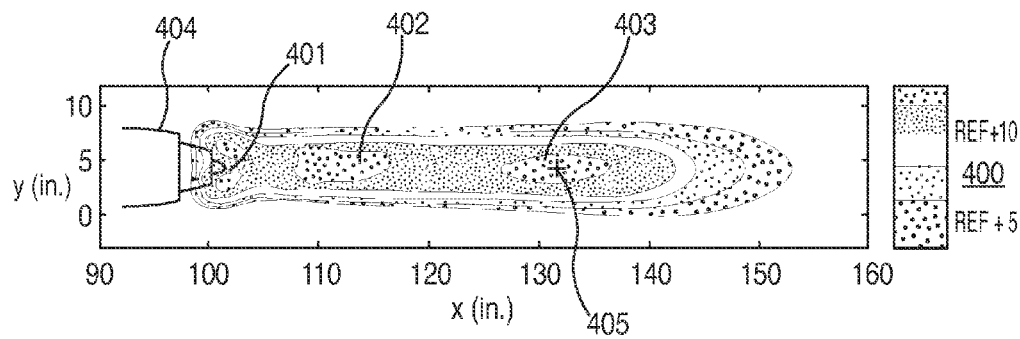
FIG. 4A is a beamform map of testing data used to explain a presently preferred method according to present disclosure.

In step 302, conventional frequency domain delay and sum beamforming (spatial filtering) is applied to each phased array data CSM for the given configuration, condition and phased array location. For flyover testing, time domain delay and sum beamforming with DeDopplerization (to account for the moving source) is used. FIG. 4A shows a sample conventional beamforming map 400 for the θ=90° phased array location at 21 kHz (model scale frequency) for a stationary device under test. Map 400 shows a well-defined noise source region 401 at the exit of nozzle 404 and two downstream noise sources 402, 403. Map 400 shows raw, uncorrected noise source map data (i.e., levels as seen at the phased array 102, not actual levels at the particular noise source, and without any correction for distance and atmospheric absorption). Ref. no. 405 (the "+" mark) designates the location in map 400 where the peak level occurs. This peak level is associated with the downstream most noise source. The peak levels in the upstream nozzle exit region are only 0.07 dB lower than the maximum peak level. This means that, if source location is defined based on the maximum peak level in map 400, there could be very wide excursions in the peak source location with frequency if the levels fluctuate even slightly between the upstream and downstream noise sources.

Figure 4B:
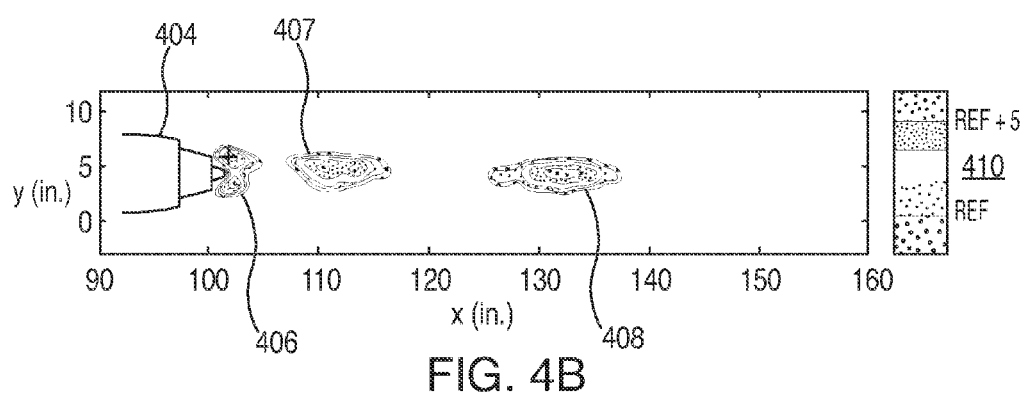
FIG. 4B is beamform map of uncorrected data after deconvolution of the data shown in FIG. 4A.

Next, at step 303, the conventional beamforming data is then deconvolved using an appropriate method. As one of ordinary skill in the art will readily recognize, there are a number of conventional deconvolution methods available for use in this process. FIG. 4B shows the deconvolved beamforming data based on a cutoff threshold of 9 dB below map peak for the processing. As evident, in FIG. 4B, the three noise subcomponent regions seen in FIG. 4A are now clearly separated, as shown by ref nos. 406, 407, 408. Notably, the peak noise level (ref. no. 406) is located near the exit of nozzle 404. As described below, this frequency falls in the range of frequencies over which the dominant noise sources transition from being downstream (noise source) dominated to upstream (nozzle exit) dominated.

At step 304, the usable frequency ranges and emission angles for each phased array subarray are calculated. A phased array may have insufficient spatial resolution capability below a certain lower frequency while the array data may begin to and continue to degrade in quality owing to decorrelation effects across the array and/or noise source directivity effects above a certain higher frequency. In effect, the usable frequency ranges and emission angles consist of the frequencies and angles over which the beamform map noise sources are well defined (clearly localized) and over which the map is largely free of non-noise related array processing artifacts. In selecting the usable ranges to use for the analyses, the same set of frequencies may be required for use across all angles in certain analyses. This leads to a tradeoff between the angle and frequency parameters. For a given analysis, if there is a need for maximum frequency coverage, a user may need to down-select the angle range. On the other hand, if maximum angular coverage is desired for a given analysis, it may be necessary to reduce the frequency range for a particular array.

Figure 4C:
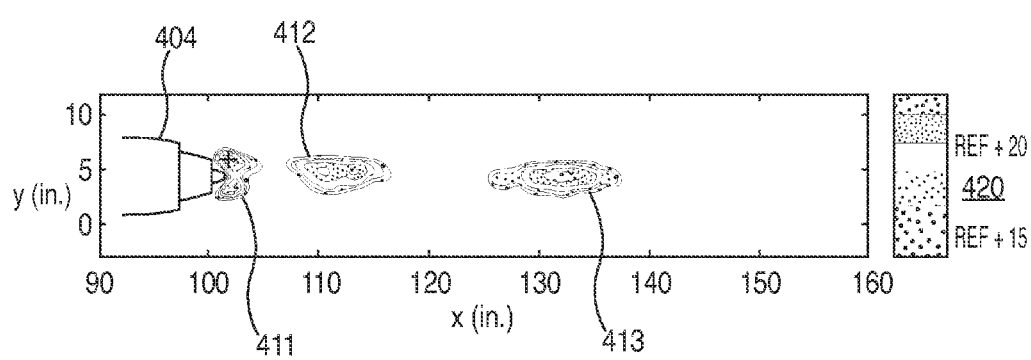
FIG. 4C is a version of the beamform map of FIG. 4B with corrected data after deconvolution.

At step 305, corrections for at least distance, atmospheric absorption loss, pressure doubling and shear layer refraction effects may be applied to the deconvolved data. As stated above, the beamform map data shown in FIGS. 4A and 4B consists of levels as measured at the phased array 102, without any correction for distance, atmospheric absorption loss pressure doubling or shear layer refraction effects at the plate face of phased array 102. In particular, at step 305 the distances are corrected to 1 foot lossless values. FIG. 4C shows the FIG. 4B levels after correction in step 305. After correction, the narrowband data are preferably reduced to ⅓ octave band levels by summing the appropriate phased array frequency bins, although one of ordinary skill in the art will readily recognize that other band definitions may be chosen for normalization (that is, nth octave band or narrowband).

Figure 5A:
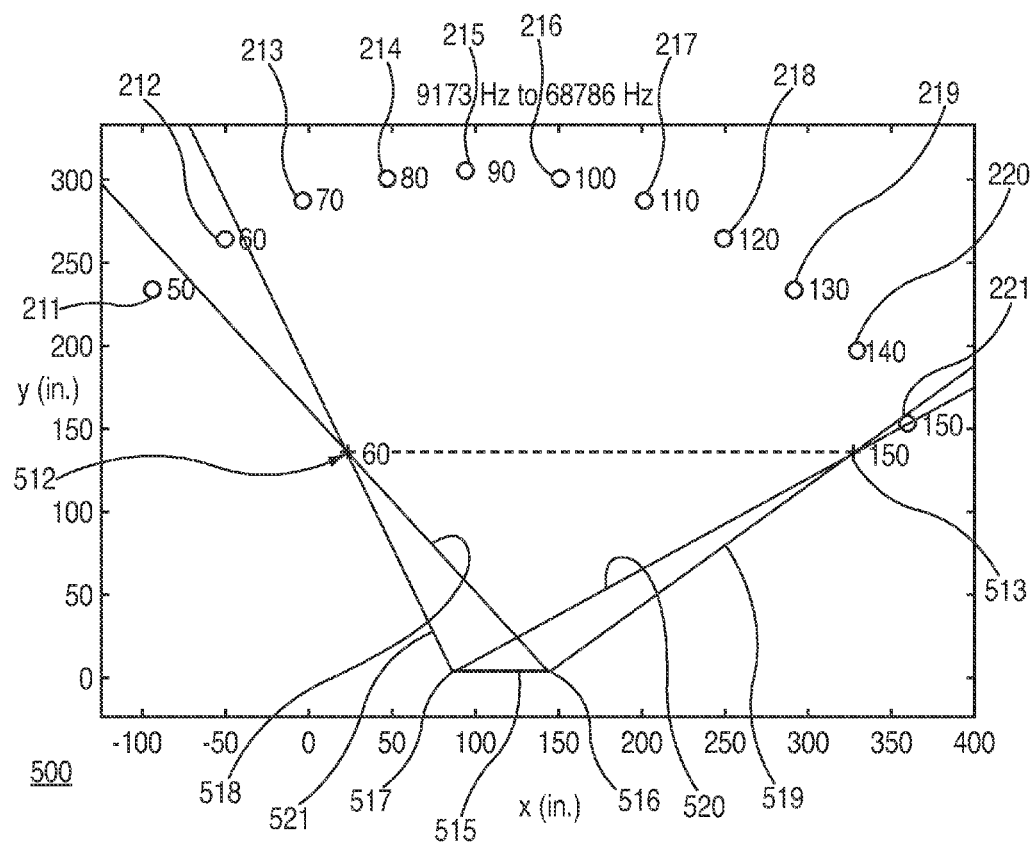
FIGS. 5A and 5B are overhead views of a testing environment used to show the valid projection space for data collected according to a presently preferred method according to present disclosure.

Next, at step 306, the space over which the noise subcomponent data can be calibrated and projected is determined. This requires scanning the corrected noise map data to determine the downstream-most and upstream-most source locations over all frequencies. FIG. 5A shows an overhead schematic 500 of the locations within the test facility of the sound sensors 211 to 221 in the far-field array 103 spanning from 50° to 150° as well as the positions of the centers of phased array 102 spanning from 60° (ref. no. 512) to 150° (ref. no. 513). Line 515 represents the complete range over which noise sources exist over all of the angles and frequencies of phased array 102. As seen, the downstream-most source 516 is at about x=145 inches. Line 518 connects source 516 with the upstream-most phased array location 512. Location 512 is the upstream-most location, instead of the 50° point shown in FIG. 2, because line 518 would extend out of range of far-field array 102 (i.e., too far upstream of sound sensor 211) if the 50° point shown in FIG. 2 was used. Likewise, line 519 connects source 516 with the downstream-most phased array location 513. The source levels at source 516—as a function of phased array angle—are therefore only defined over the interior angle bounded by lines 518, 519. Similarly, lines 520, 521 represent the bounds over which the source levels at the upstream-most source 517 can be defined. The intersection of the included angle ranges of these two sets is shown as the shaded region 530 in FIG. 5B. Region 530 therefore defines the space over which all source points spanning between sources 516 and 517 are completely defined by all phased array locations. Outside of this region 530, the noise levels between sources 516 and 517 may be only partially defined (i.e., incomplete) or not defined at all, therefore precluding their use for analysis. Region 530 corresponds to the locations to which the phased array data can be projected and identifies which of the sound sensors 211 to 221 can be used for calibrating the data from phased array 102 (i.e., only the sound sensors within region 530 may be used—sound sensors 213 to 220).

Figure 6A:
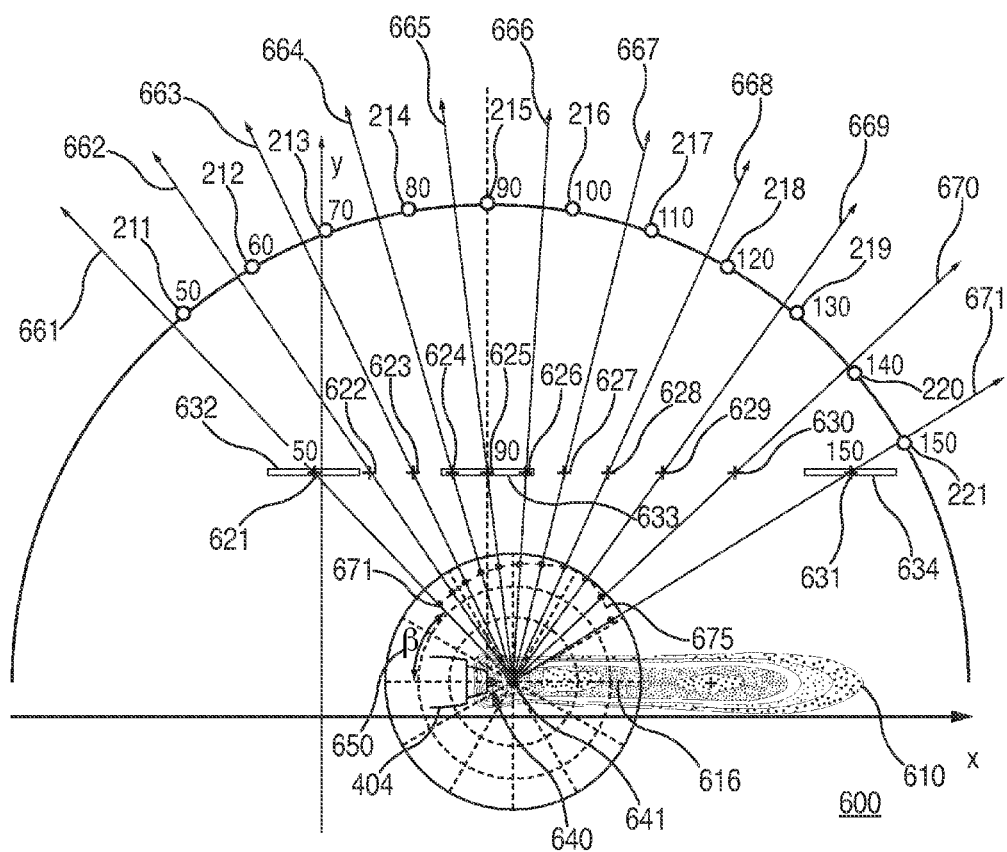
FIGS. 6A and 6B are noise directivity charts used to show how source levels are obtained at each grid point according to a presently preferred method according to present disclosure.

At step 307, the noise source directivity is extracted at each point on the beamforming grid for each frequency. FIG. 6A is an overhead plot of the test facility 600 illustrating the key features leading to extraction of the phased array signal levels. Included in FIG. 6A are locations for sound sensors 211 to 221 in the polar array 103 from 50° to 150°, a beamform map 610 with extended noise sources, and an outline 404 of the nozzle under test (the beamform map 610 is deliberately enlarged for illustration purposes). Also shown are the locations of the phased array 102 at the 50° to 150° phased array measurement locations 621 to 631, with rectangle 632, 633, 634 showing the phased array 102 positions at the 50°, 90° and 150° phased array locations, respectively. The common origin 640 of the polar array 103 and the phased array 102 is at the primary nozzle exit of the nozzle 404 on the nozzle centerline 616. A ray 661 propagates from a grid point 641 through the 50° phased array 632 location 621 and makes an angle β 650 with respect to centerline 616. Angle β 650 does not have a measure of 50° because the grid point 641 is offset downstream from the polar array origin 640. The noise level along ray 661 is indicated by a dot 671 in the polar plot. This level corresponds to the level as measured by the phased array 102. This process is repeated during step 307 over all phased array positions to define the noise directivity at the grid point of interest as shown by dashed curve 675.

Figure 6B:
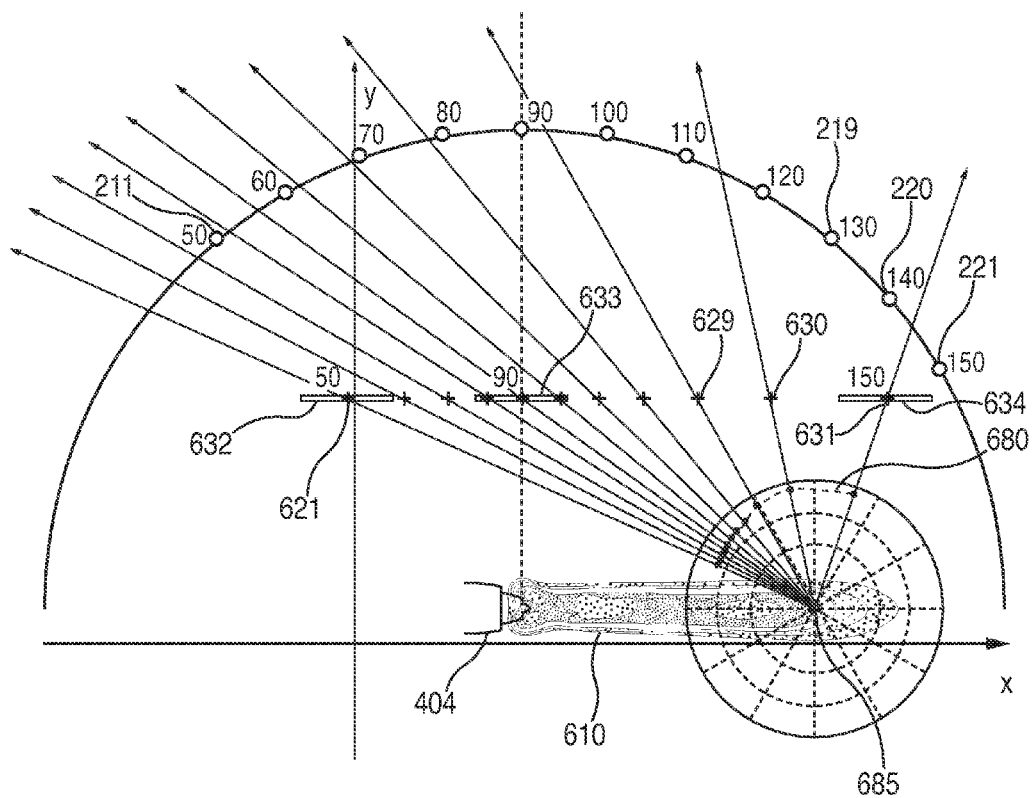

FIG. 6B shows an equivalent image to FIG. 6A, but with a grid point 685 located farther downstream within beamform map 610. In this case, the directivity (as shown by dashed curve 680) is tightly sampled over most of the locations of the phased array 102, but becomes significantly coarse over the locations at 130°, 140° and 150° degree phased array location 629, 630, 631 measurements, suggesting that the phased array measurements should be preferably acquired at equal intervals along the array traverse instead of at equal angles. This is important since, in projecting the noise levels to different spatial locations, interpolation of the noise level directivity curve is used.

Figure 5B:
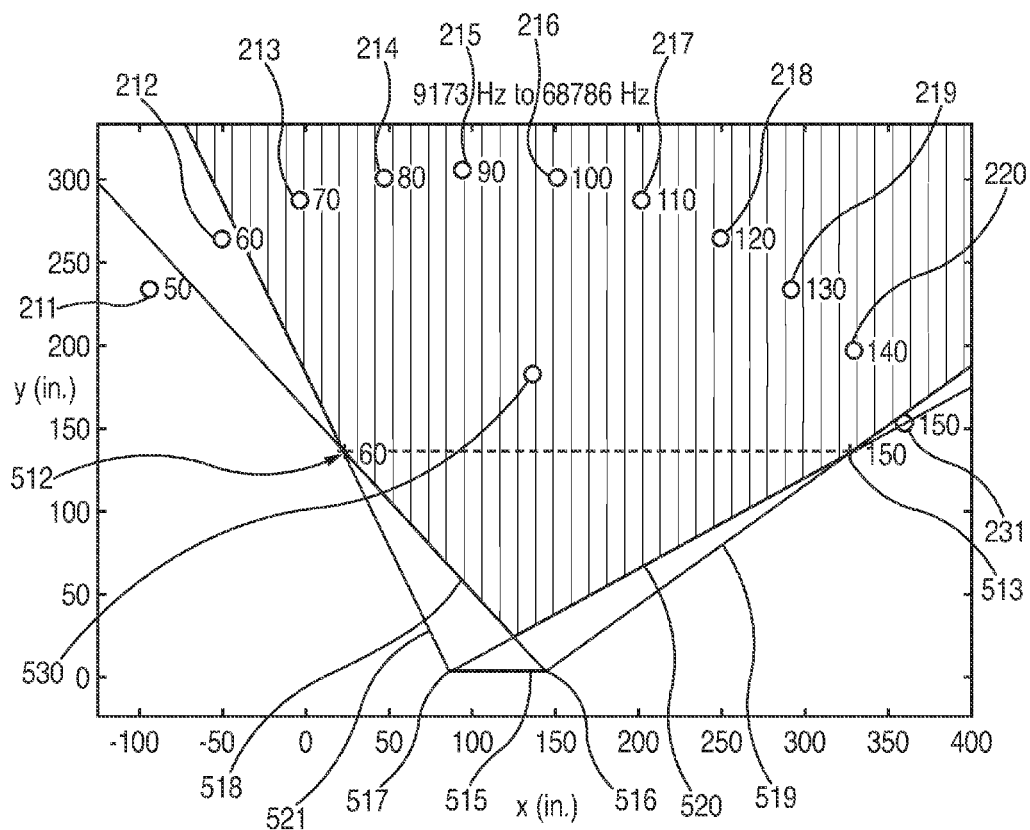
Figure 7:
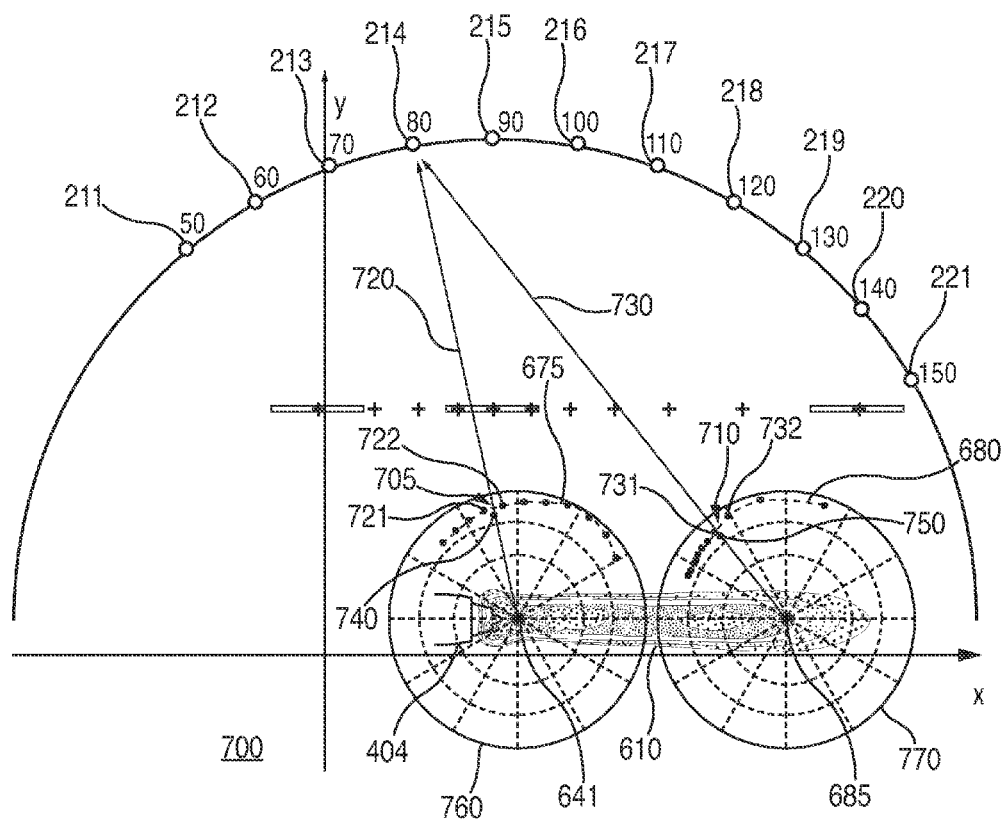
FIG. 7 is a composite noise directivity chart including the information from both FIGS. 6A and 6B.

At step 308, the frequency data at each grid point are calibrated using the corresponding frequency data from the polar array 103 sound sensors 211 to 221 (note that phased array frequency data are typically narrowband or nth octave band in content). Standard practice for conventional beamforming of phased array data typically involves replacement of the cross-spectral matrix (CSM) diagonal elements with the average value across each CSM row, or deletion of the diagonal elements. Replacement of the CSM diagonal in these ways allows for significant improvement in the noise source localization quality in the beamform maps. However, this modification results in a change of the energy balance in the data. That is, the conventional beamforming output levels will be impacted. Owing to this and other array processing effects, the phased array data must be calibrated in order to allow for correct projection of the noise source levels. The calibration is achieved through use of the polar microphone spectra. FIG. 7 is a composite of FIGS. 6A and 6B, showing the polar plot curves 675, 680 generated in step 307. Based on an assumption that the noise level contours shown in beamform map 610 include all noise sources in the testing environment (i.e., that there are no significant noise sources outside of the beamforming grid), for a given sound sensor within the polar array 103, e.g., sound sensor 214, the noise source at the upstream grid point 641 propagates to sound sensor 214 along ray path 720. Ray path 720 passes through the noise directivity curve 675 between measured points (points 721 and 722). In order to project the noise level at grid point 641 to sound sensor 214, the noise level therefore needs to be interpolated from the directivity curve 675 to obtain a projection level value (point 705). The level of this interpolated value is then projected to the sound sensor 214 by applying corrections for distance and atmospheric absorption. Similarly, at downstream grid point 685, the noise source at location 685 projects along ray 730 to sound sensor 214 and likewise requires interpolation between measured points (points 731 and 732) to point 710 for noise level projection purposes. The projected levels from these grid points 641, 685 are then summed together to obtain the total noise contribution from these two grid points to the levels measured at the sound sensor 214. This process of interpolation, projection and summation is repeated over all remaining grid points, thus providing the total noise contribution from all grid points to sound sensor 214. Theoretically, the total (summed) value will be exactly equal to the spectral level measured by sound sensor 214 at the frequency of interest. However, in practice this is not necessarily the case owing to the modification of the CSM diagonal elements and to array processing effects. Therefore, a calibration value must be defined as the difference between the actual level at sound sensor 214 and the summed levels obtained from projection of the phased array levels at the grid points to the sound sensor 214. This calibration value is then applied directly back to all of the grid spectral values in beamform map 610 (along the reverse direction of the rays paths (e.g., lines 720, 730) connecting the grid points to sound sensor 214). This process yields calibrated directivity levels shown by the dots 740, 750 in the respective polar plots 760, 770 in FIG. 7. This process is repeated for all of the valid (as determined in step 306) sound sensors among sound sensors 211 to 221 (FIG. 5B shows that only sound sensors 213 to 220 have valid data) to obtain a complete set of calibrated noise levels at each grid point. For convenience, the calibrated levels are preferably corrected to a 1 foot lossless distance by applying appropriate atmospheric absorption and distance corrections. By applying such a correction, it is then straightforward to project the calibrated noise levels to any desired spatial location, subject to the valid projection space constraints as determined in step 306.

Figure 8:
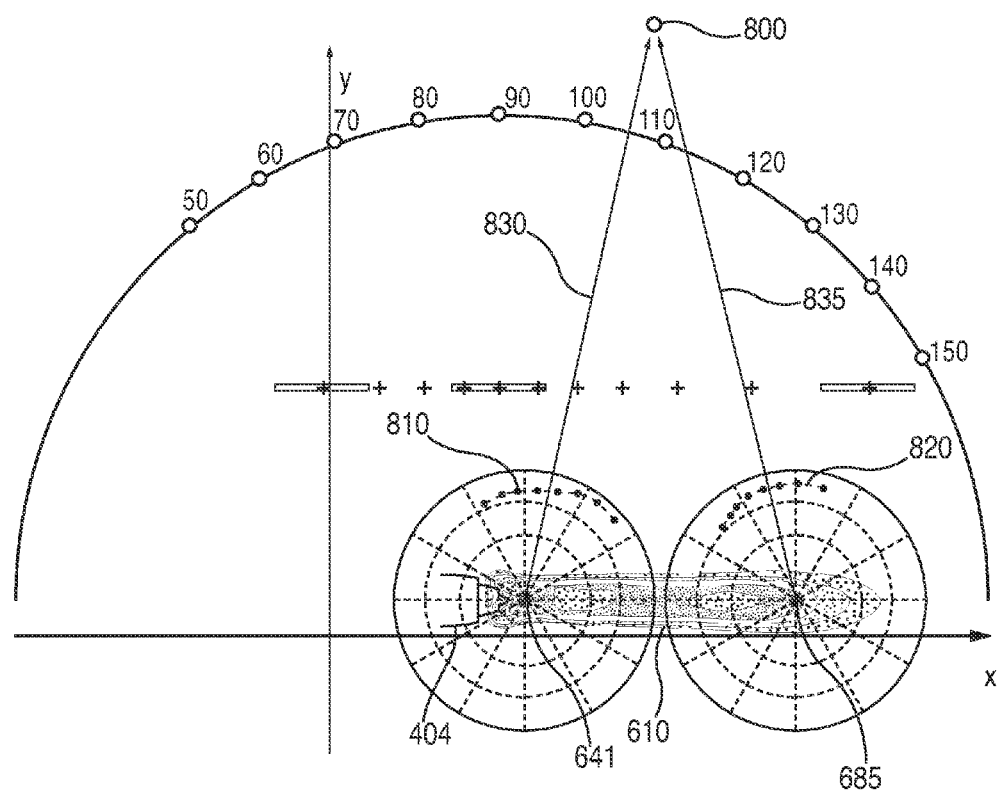
FIG. 8 is a diagram showing how calibrated data is projected to a desired location according to a presently preferred method according to present disclosure.

At step 309, the calibrated data is projected to a desired location. The process for projecting the calibrated data is analogous to the calibration procedure described earlier, as shown in FIG. 8. In FIG. 8, point 800 designates a desired projection point. The calibrated 1 foot lossless directivity data (from curve 810) at the upstream grid point 641 is used to obtain an interpolated value corresponding to the point where ray 830 (that projects from grid point 641 to point 800 with the level being corrected for atmospheric absorption loss and distance) crosses curve 810. Similarly, the calibrated 1 foot lossless directivity data (from curve 820) at the downstream grid point 685 is used to obtain an interpolated value corresponding to the point where ray 835 (that projects from grid point 685 to point 800 with the level being corrected for atmospheric absorption loss and distance) crosses curve 820. This process is applied over all remaining grid points in beamform map 610 to provide a complete set of projected levels—from all such grid points—that are then summed together to provide the total noise level at point 800.

Figure 9:
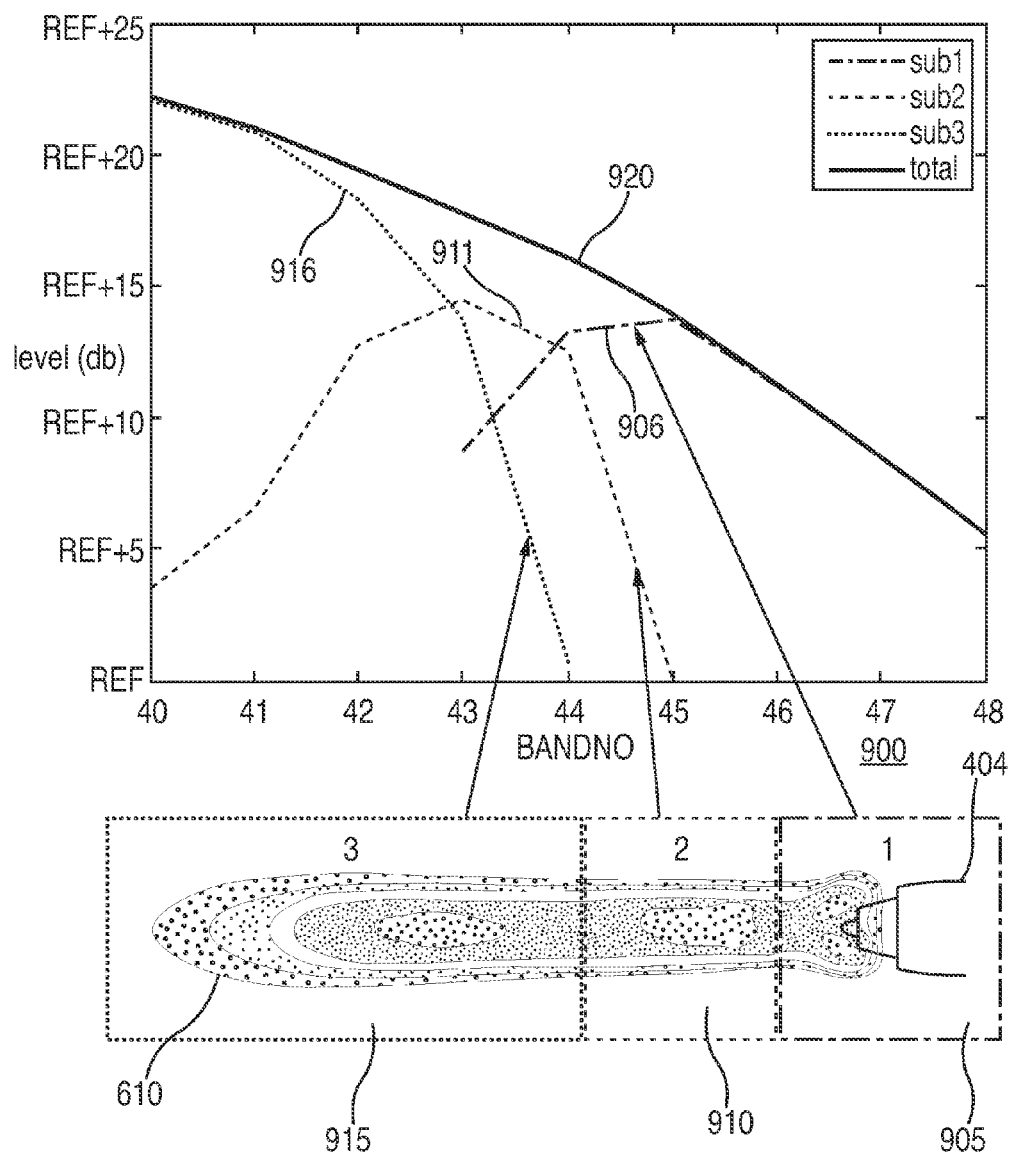
FIG. 9 is a plot showing the noise distribution from three different zones within the beamform map.

Of particular interest for noise source analysis is determination of the level of contribution of various subcomponent regions to the total noise levels. Note from the beamform map 610 in FIG. 9 that there are three prominent noise sources at this particular frequency, shown as zone 1 (905), zone 2 (910) and zone 3 (915). Zone 1 (905) corresponds to noise near the nozzle exit, which is known to dominate at high frequencies while zone 2 (910) and zone 3 (915) capture the remaining (downstream) noise sources, which may include, for example, jet mixing noise that dominates at low frequency. It is desirable to project (separately) the noise levels from each of these zones to the location of the 90° polar array sound sensor. The determination of the noise contribution from each zone 905, 910, 915 follows the same procedure as described above for determining the total levels, but instead only projects the levels from within a given zone. The resulting spectra are shown in the line plot 900 in FIG. 9. Curve 920 corresponds to the total projected levels which are, by default, the same as the polar array 103 levels because the phased array 102 levels have been calibrated to the polar array 103 levels. The zone 1 (905) nozzle levels (subcomponent spectra) correspond to curve 906 in FIG. 9 and are first measurable at band 43 and increase continuously in level up to band 45, beyond which they are essentially the same as the total levels (i.e., the nozzle noise source completely dominates the noise field starting at band 45). At the downstream end of the noise field, zone 3 (915) nozzle levels (subcomponent spectra) correspond to curve 916 which dominates the noise contributions completely for bands 40 and 41 and then continuously decreases (in terms of contribution to the total) owing initially to the increasing influence of the noise source within zone 2 (910) (the zone 2 nozzle levels (subcomponent spectra) corresponding to curve 911) which has a peak contribution at band 43. FIG. 9 clearly illustrates how the balance in noise contribution varies with frequency owing to the noise sources in the three zones 905, 910, 915 and captures the frequencies at which each noise source dominates.

Figure 10:
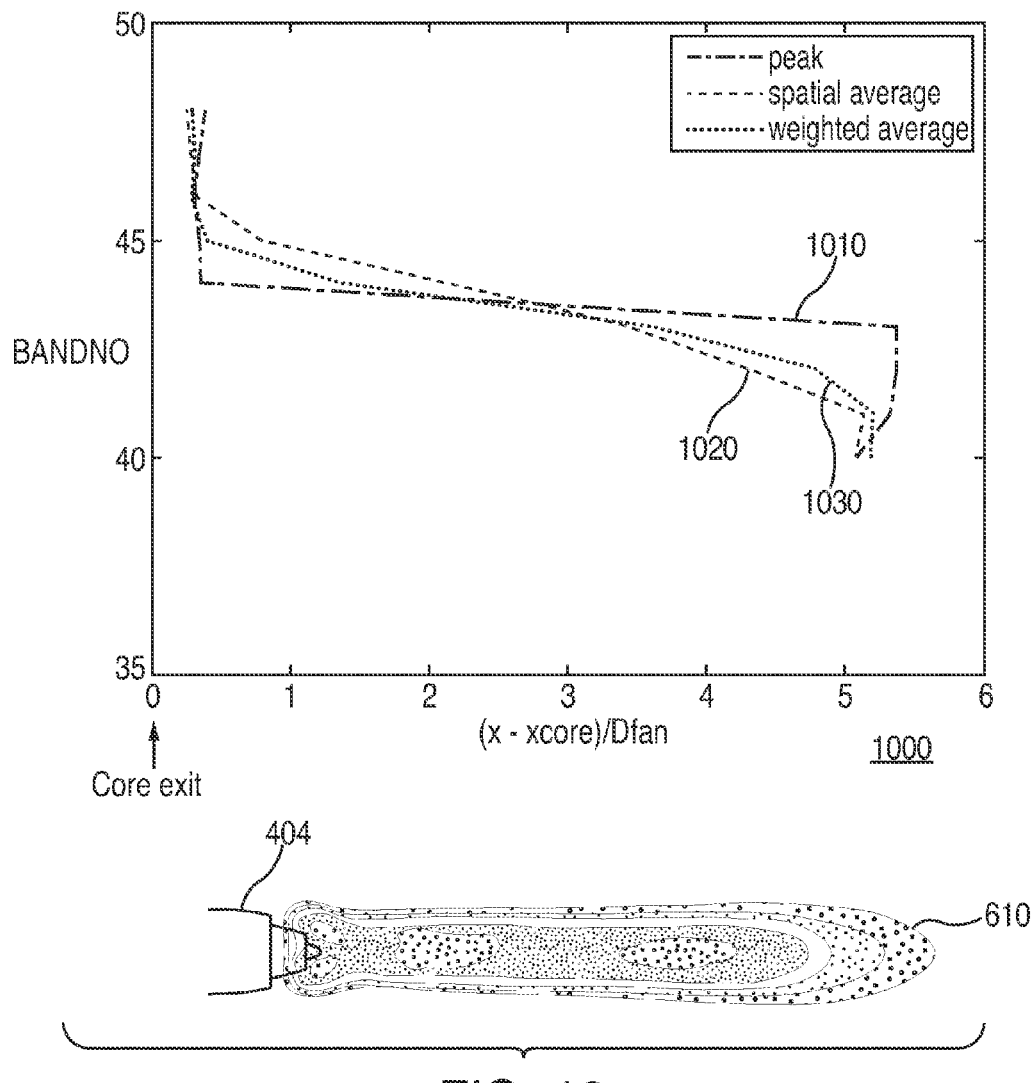
FIG. 10 is a plot showing the variation of source location with frequency for a beamform map using corrected data.

At step 310, the source locations are extracted for user-defined zones. In addition to being able to project the noise subcomponent levels to different spatial locations, there is also a need to know how the locations of the dominant noise sources vary spatially. FIG. 10 includes a plot 1000 which shows the variation of source location with frequency for beamform map 610. Note that the horizontal axis has been normalized in terms of distance (x) from the core nozzle exit location (xcore) and fan nozzle exit diameter (Dfan). There are various options available for defining source location. One definition is to determine the location on the noise map (at a given frequency) at which the highest level occurs, that is, the peak level location versus frequency (global peak). This is shown by curve 1010 in the plot 1000. At lower frequencies, the dominant noise sources are about 5 fan nozzle diameters downstream of the primary nozzle exit and the high frequency dominant noise sources are centered just downstream of the primary nozzle exit. A clear transition occurs in curve 1010 at band 44 below which the downstream noise sources dominate and above which the nozzle exit sources dominate. However, the use of a global peak for defining the dominant source location does not account for the presence of other noise sources or their potential influence on the source location calculation. To address this issue, a first alternative source location definition instead calculates the mean value of all locations for which noise sources exist (in this case, a threshold level is set below the peak level in the map to define the grid points for which the levels exceed the threshold). This definition therefore takes into account the spatial distribution of all of the noise sources. The result of such calculation is shown as curve 1020 in FIG. 10. A second alternative source location definition instead consists of calculating a weighted average using the noise levels at each grid point for the weighting. This is shown by the curve 1030 in FIG. 10. The first thing to notice is that the spatial average (curve 1020) and weighted average (curve 1030) definitions provide relatively similar calculations of source location versus frequency (even though the differences vary by up to about half a fan diameter, this is considered to be a small difference in terms of projecting source locations to flight). There is a large difference in source locations between the calculations based on spatial/weighted averages (curves 1020 and 1030) and the calculations based on global peak level (curve 1010), on the order of several fan diameters, which is significant and can lead to large errors in projecting source locations to flight.

Figure 11:
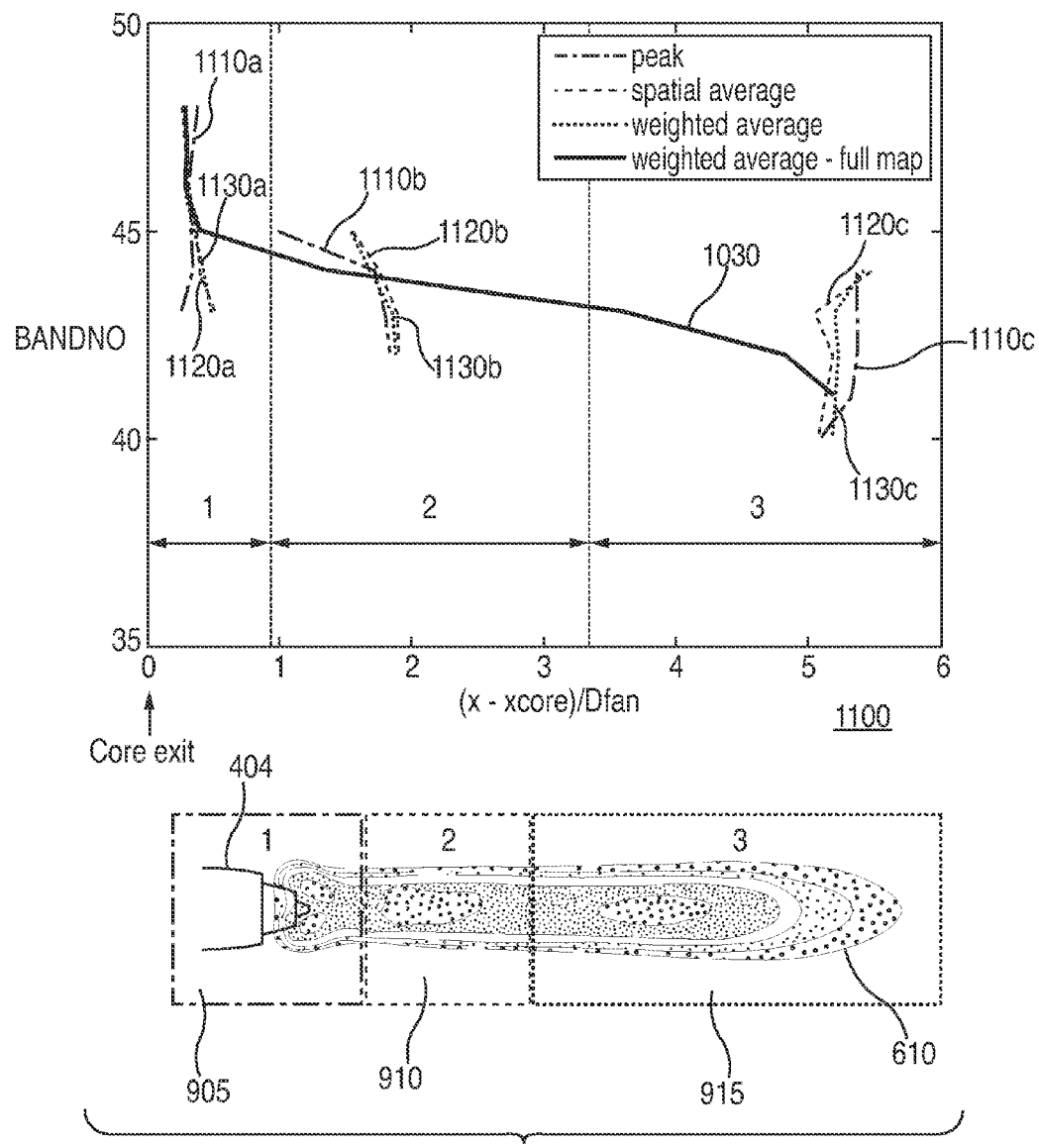
FIG. 11 is a plot showing the variation of source location with frequency for three different zones within the beamform map.

The source location calculations may be further refined by restricting the analyses to the three zones defined earlier. The results of such analyses are shown in plot 1100 in FIG. 11 based on the calibrated data from beamform map 610. Plot 1100 includes the weighted average calculation curve 1030 from FIG. 10. Each zone includes respective peak curves 1110*a*, 1110*b*, 1110*c*, respective spatial average curves 1120*a*, 1120*b*, 1120*c* and respective weighted average curves 1130*a*, 1130*b*, 1130*c*. Reduction to separate zones allows for source location data that extends over a wider frequency range than can otherwise be obtained when considering the full map. For example, in FIG. 10, the downstream source location only extends to band 43, owing to the dominance by the nozzle noise sources for bands 44 and higher. However, by restricting the calculations to specified zones, the downstream noise source, zone 3 (915), is seen to extend higher to band 44 in FIG. 11. Similarly, the nozzle noise source, zone 1 (905), is seen in FIG. 11 to extend to an even lower frequency. The intermediate influence of the zone 2 (910) source is also evident in FIG. 11. By isolating zones instead of using peak or average source locations, the full frequency range can be seen over which each individual source has significant contributions (or even exists as an identifiable noise source).

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for determining at least one characteristic of a device under test, comprising:
a first array of sound sensors, the first array mounted on a platform;
a separate second array of sound sensors, each of the sound sensors in the second array mounted in a spaced apart fixed position separate from the platform; and
a processing system for processing first information from the sound sensors in the first array of sound sensors and second information from the second array of sound sensors, the processing system configured to collect and store the first and second information for a plurality of predetermined points, to spatially filter the first information to create filtered first information, to process and then calibrate the filtered first information based on the second information, and to further process the calibrated first information to obtain a characteristic at a selected location.

2. The system of claim 1, wherein the platform is moveable from a starting position with respect to the device under test to an ending position with respect to the device under test, wherein the spaced apart fixed position is with respect to the device under test, wherein the processing system is further configured to collect and store the first and second information for a plurality of predetermined points as the first array of sound sensors is moved from the starting position to the ending position.

3. The system of claim 1, wherein the platform is fixed; and wherein the processing system is configured to collect and store the first and second information as the device under test moves from a starting position to an ending position.

4. The system of claim 1, wherein the processing system is further configured to extract source location information from the processed and calibrated first information.

5. The system of claim 1, wherein the first array is an adaptable aperture array.

6. The system of claim 2, wherein the second array is a polar array with each sound sensor in the second array spaced an even distance from an origin point located proximal to the device under test.

7. The system of claim 1, wherein the processing of the first information comprises determining usable frequency ranges and usable first array positions.

8. The system of claim 1, wherein the processing of the first information comprises correcting for at least one of distance, atmospheric absorption, pressure doubling and shear layer refraction effects.

9. The system of claim 1, wherein the processing of the first information comprises determining a space over which the filtered first information can be projected.

10. The system of claim 1, wherein the processing of the first information comprises determining a noise source directivity characteristic for each point within the filtered first information.

11. A computer-implemented method for determining at least one characteristic of a device under test, comprising the steps of:
collecting and storing first information from a first array of sound sensors, the first array mounted on a platform, and second information from a separate second array of sound sensors, each of the sound sensors in the second array mounted in a spaced apart fixed position separate from the platform, the first information and the second information collected and stored for a plurality of predetermined points;
spatially filtering the first information to create filtered first information;
processing and then calibrating the filtered first information based on the second information, and
further processing the calibrated first information to obtain a characteristic at a selected location.

12. The method of claim 11, wherein the platform is moveable from a starting position with respect to the device under test to an ending position with respect to the device under test, wherein the spaced apart fixed position is with respect to the device under test, wherein the collecting and storing step collects and stores the first and second information for a plurality of predetermined points as the first array of sound sensors is moved from the starting position to the ending position.

13. The method of claim 11, wherein the platform is fixed; and wherein the collecting and storing step collects and stores the first and second information as the device under test moves from a starting position to an ending position.

14. The method of claim 11, further comprising the step of extracting source location information from the processed and calibrated first information.

15. The method of claim 11, wherein the step of processing of the first information comprises determining usable frequency ranges and usable first array positions.

16. The method of claim 11, wherein the step of processing of the first information comprises correcting for at least one of distance, atmospheric absorption loss, pressure doubling and shear layer refraction effects.

17. The method of claim 11, wherein the step of processing of the first information comprises determining a space over which the filtered first information can be projected.

18. A non-transitory computer readable storage medium storing computer usable program code for determining at least one characteristic of a device under test, comprising:
program code for collecting and storing first information from a first array of sound sensors, the first array mounted on a platform, and second information from a separate second array of sound sensors, each of the sound sensors in the second array mounted in a spaced apart fixed position separate from the platform, the first information and the second information collected and stored for a plurality of predetermined points;
program code for spatially filtering the first information to create filtered first information;
program code for processing and then calibrating the filtered first information based on the second information, and
program code for further processing the calibrated first information to obtain a characteristic at a selected location.

19. The non-transitory computer readable storage medium of claim 18, wherein the platform is moveable from a starting position with respect to the device under test to an ending position with respect to the device under test, wherein the spaced apart fixed position is with respect to the device under test, and wherein the program code for collecting and storing collects and stores the first and second information for a plurality of predetermined points as the first array of sound sensors is moved from the starting position to the ending position.

20. The non-transitory computer readable storage medium of claim 18, wherein the platform is fixed; and wherein the program code for collecting and storing collects and stores the first and second information as the device under test moves from a starting position to an ending position.

\* \* \* \* \*